United States Patent [19]

Miyazaki et al.

[11] Patent Number: 4,892,606

[45] Date of Patent: Jan. 9, 1990

[54] OPTICAL RECORDING MEDIUM HAVING SPACE THEREIN AND METHOD OF MANUFACTURING THE SAME

[75] Inventors: Takeshi Miyazaki; Tetsuro Fukui, both of Kawasaki; Tsuyoshi Santoh, Yokohama, all of Japan

[73] Assignee: Canon Kabushiki Kaisha, Tokyo, Japan

[21] Appl. No.: 88,272

[22] Filed: Aug. 24, 1987

[30] Foreign Application Priority Data

| Aug. 28, 1986 | [JP] | Japan | 61-199935 |
| Sep. 10, 1986 | [JP] | Japan | 61-211473 |
| Sep. 16, 1986 | [JP] | Japan | 61-215862 |
| Sep. 16, 1986 | [JP] | Japan | 61-215863 |
| Sep. 24, 1986 | [JP] | Japan | 61-223837 |
| Oct. 8, 1986 | [JP] | Japan | 61-239850 |

[51] Int. Cl.$^4$ .................. B32B 31/12; G11B 7/26
[52] U.S. Cl. .................. 156/275.5; 156/275.7; 156/276; 156/295; 156/307.3; 346/135.1; 346/137; 369/286; 369/288
[58] Field of Search ............ 156/276, 295, 538, 539, 156/563, 307.3, 275.5, 275.7; 360/135; 369/286, 288; 346/135.1, 137; 252/363.5

[56] References Cited

U.S. PATENT DOCUMENTS

| 3,198,657 | 8/1965 | Kimball et al. | 360/135 |
| 3,406,053 | 10/1968 | Jaenicke | 156/306.9 |
| 3,655,482 | 4/1972 | Schildkraut et al. | 156/276 |
| 3,857,731 | 12/1974 | Merrill, Jr. et al. | 428/354 |
| 3,881,243 | 5/1975 | Bannon | 156/73.1 |
| 3,919,452 | 11/1975 | Ettre et al. | 156/276 |
| 4,096,023 | 6/1978 | Bivens | 156/563 |
| 4,300,966 | 11/1981 | Hoffmann | 156/578 |
| 4,388,132 | 6/1983 | Hoge et al. | 156/295 |
| 4,536,428 | 8/1985 | Murata et al. | 428/119 |
| 4,539,220 | 9/1985 | Martinelli | 156/253 |
| 4,647,473 | 3/1987 | Kato et al. | 360/135 |
| 4,670,072 | 6/1987 | Pastor et al. | 156/73.1 |

FOREIGN PATENT DOCUMENTS

| 0195720 | 9/1986 | European Pat. Off. | |
| 1203933 | 9/1970 | United Kingdom | 156/330 |

*Primary Examiner*—Michael Wityshyn
*Attorney, Agent, or Firm*—Fitzpatrick, Cella, Harper & Scinto

[57] ABSTRACT

An optical recording medium has a space therein and is prepared such that a pair of substrates are partially adhered by an adhesive obtained by dispersing granular or filler type spacing members therein. At least one of the substrates has an optical recording layer thereon, the recording layer faces inside and a specific gravity of the spacing member falls within a range of 0.9 to 1.3 times that of the adhesive. When applying the adhesive to part of at least one of the substrates, a mixture of the spacing members and an adhesive is stored in a tank and is supplied in a small amount in each application cycle.

9 Claims, 4 Drawing Sheets

OPTICAL RECORDING MEDIUM HAVING SPACE THEREIN AND METHOD OF MANUFACTURING THE SAME

BACKGROUND OF THE INVENTION

1. Field of the Invention

The present invention relates to an optical recording medium having space therein and a method of manufacturing the same.

2. Related Background Art

In recent years, extensive studies and developments have been made for information recording media for optically recording/reproducing information in favor of high-density, high-capacity recording, random access, and low cost per bit. A sectional structure of a typical example of a conventional optical recording medium (two-sided recording type) having a hollow structure is illustrated in FIG. 1. Disk-like substrates 1a and 1b central holes transparent to a laser beam, and are made of glass, a plastic or the like. Optical recording layers 2a and 2b are respectively formed on the substrates 1a and 1b. The recording layers 2a and 2b are made of a material subjected to a shape change, a phase change, a magnetooptical change, a chemical decomposition, or the like upon laser radiation. An auxiliary layer such as a very thin reflecting layer or a protective layer may be formed on each recording layer. The substrates 1a and 1b respectively having the recording layers 2a and 2b thereon are adhered by ring-like adhesive layers 3 and 4 respectively defining the inner and outer peripheral portions of the substrates 1a and 1b, so that adhesive layers 3 and 4 serve as spacers to define a space 5.

In the conventional optical recording medium having a hollow structure described above, the thicknesses of the adhesive layers serving as the spacers must be uniform. If variations in distance between the substrates 1a and 1b defining the space 5 occur, vertical displacements of the surface of the recording disk occur upon its rotation on a turntable. It is therefore difficult to appropriately perform focusing control and tracking control.

In order to set the distance between the substrates 1a and 1b uniform, Japanese Pat. Laid-Open Application No. 226046/1985 describes an optical recording medium, the sectional structure of which is illustrated in FIG. 2. The medium shown in FIG. 2 does not have a hollow structure. Substrates 1a and 1b having recording layers 2a and 2b thereon are adhered by an adhesive 6 prepared by dispersing spacing members 7 therein, so that the entire inner surfaces of the substrates 1a and 1b are in contact with the adhesive 6. With the above structure, the distance between the substrates 1a and 1b is kept uniform according to the thickness of the spacing members 7. The spacing member 7 is made of glass or a resin material such as polymethyl methacrylate (PMMA). An ultraviolet curing adhesive is preferably used as the adhesive 6. Japanese Pat. Laid-Open Application No. 168947/1984 also discloses an example wherein the above technique is applied to an optical recording medium having a hollow structure. This example will be described with reference to the sectional view of FIG. 3. Referring to FIG. 3, the inner and outer peripheral portions of disk-like substrates 1a and 1b having recording layers 2a and 2b thereon are adhered by ring-like adhesive layers 13 and 14 serving as spacers, respectively. The adhesive layers 13 and 14 are made of an adhesive 15 in which granular or filler type spacing members 16 are dispersed. The size of a space 6 between the substrates 1a and 1b is kept uniform according to the thickness of the spacing member 16.

With the above structure, however, a nonuniform distribution of the spacing members between the substrates 1a and 1b often fails to keep the distance between the substrates 1a and 1b uniform with rated high precision. For example, when adhesive layers are to be partially formed between the substrates 1a and 1b, a mixture of spacing members and an adhesive is stored in a tank and is supplied in a small amount in each operation cycle. In this case, a mixing ratio of the adhesive to the spacing members varies as a function of time, thus causing a nonuniform distribution of the spacing members.

SUMMARY OF THE INVENTION

It is an object of the present invention to solve the conventional problems described above and to provide an optical recording medium having a uniform thickness of a hollow portion between the substrates with high precision and a method of manufacturing the same.

In order to achieve the above object, there is provided an optical recording medium having a space therein and prepared such that a pair of substrates at least one of which has an optical recording layer thereon are partially adhered by an adhesive obtained by dispersing granular or filler type spacing members therein while the recording layer faces inside, wherein a specific gravity of the spacing member falls within the range of 0.9 to 1.3 times that of the adhesive.

The above optical recording medium is manufactured by a method comprising the steps of: forming an optical recording layer on at least one of a pair of substrates; applying an adhesive to part of at least one of the pair of substrates, the adhesive being obtained by dispersing granular or filler type spacing members therein, the spacing member having a specific gravity which falls within the range of 0.9 to 1.3 times that of the adhesive, the spacing members and the adhesive being mixed to prepare a mixture, the mixture being stored in a tank and being supplied in a small amount in each application cycle; adhering the pair of substrates while the recording layer faces inside; and curing the adhesive.

The present inventors found that a nonuniform distribution of the spacing members in the adhesive was caused by floating/sinking of the spacing members, and defined a ratio of the specific gravity of the spacing member to that of the adhesive, which does not cause such floating/sinking.

DETAILED DESCRIPTION OF THE PREFERRED EMBODIMENT

The present invention will be described in detail with reference to the accompanying drawings.

Figure 1:
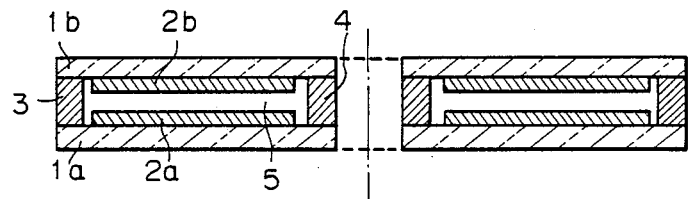
FIGS. 1 to 3 are sectional views showing structures of conventional optical recording media, respectively.
Figure 2:
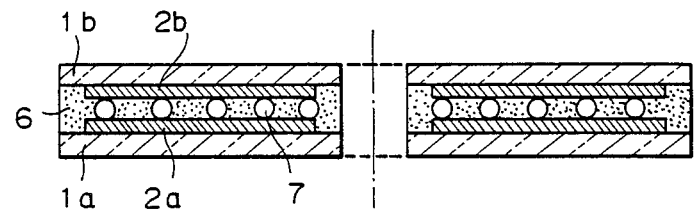
Figure 3:
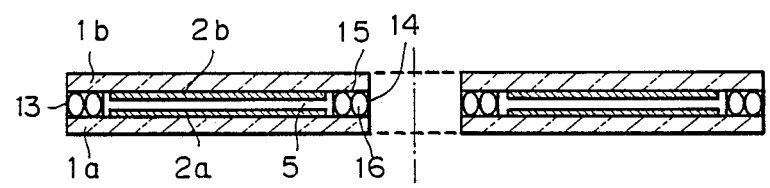
Figure 4:
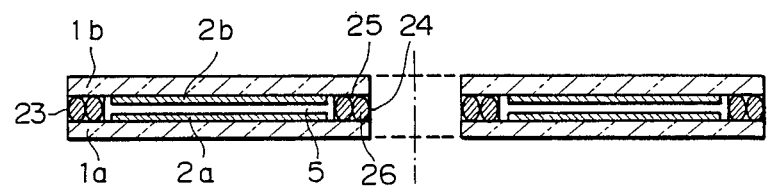
FIG. 4 is a sectional view showing a structure of an optical recording medium according to an embodiment of the present invention.

FIG. 4 is a sectional view showing an optical recording medium according to an embodiment of the present invention. Disk-like substrates 1a and 1b have central holes transparent to a laser beam, and are made of glass, a plastic or the like. Optical recording layers 2a and 2b are respectively formed on the substrates 1a and 1b. The recording layers 2a and 2b are made of a material subjected to a shape change, a phase change, a magnetooptical change, a chemical decomposition, or the like upon laser radiation. Examples of such a material are a material represented by a low melting metal (e.g., Te an Bi) and an organic dye (e.g., a cyanin dye and a methine dye) and subjected to pit formation, a material represented by As-Te-Ge and $TeO_x$ and subjected to a phase change, and a material represented by GdCo, TbFe, TbFeCo, and GdTbFeCo and subjected to magnetic inversion. Auxiliary layers such as very thin reflecting layers and protective layers may be formed on upper and lower surfaces of the recording medium, respectively. The substrates 1a and 1b respectively having the recording layers 2a and 2b thereon are adhered by ring-like adhesive layers 3 and 4 respectively defining the inner and outer peripheral portions of the substrates 1a and 1b, so that adhesive layers 23 and 24 serve as spacers to define a space 5. The adhesive layers 23 and 24 are made of an adhesive 25 prepared by dispersing granular or filler type spacing members 26 therein. The specific gravity of the spacing member 26 falls within the range of 0.9 to 1.3 times that of the adhesive 25. With the above arrangement, the distance between the substrates 1a and 1b is kept uniform according to the size (diameter if the member is spherical) of the spacing member 26.

A method of manufacturing the above optical recording medium will be described below.

The recording layers 2a and 2b are respectively formed on the substrates 1a and 1b. At this time, if the recording layer is made of an organic dye or the like, spinner coating is generally employed. However, if the recording layer is made of a metal or a metal compound, the layer is deposited on the substrate by vacuum deposition, sputtering or the like. Furthermore, if a one-sided recording medium is to be fabricated, the recording layer is formed on only one of the substrates.

Figure 5:
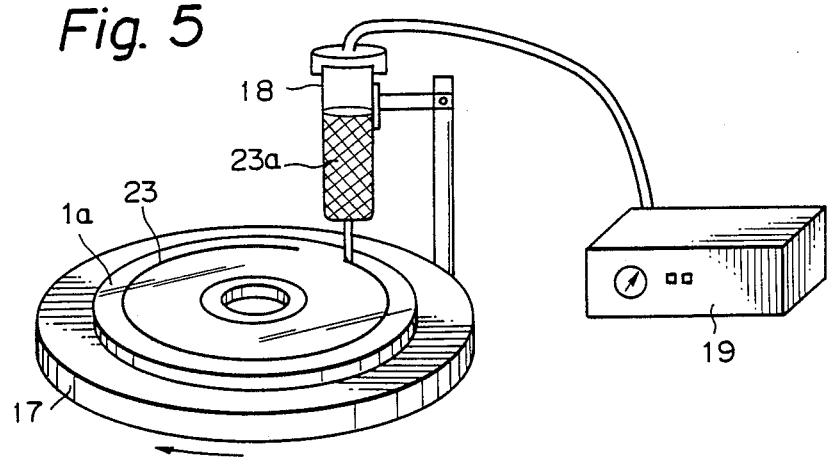
FIG. 5 is a schematic perspective view of a constant delivery apparatus used for manufacturing the medium of the present invention.

An adhesive is applied to at least one substrate by dispenser coating using a constant delivery apparatus shown in the schematic perspective view of FIG. 5.

Referring to FIG. 5, the substrate 1a is placed on a turntable 17 and is then rotated. A syringe 18 contains a mixture 23a prepared by mixing the spacing members 26 and the adhesive 25. The mixture 23a is delivered from the syringe 18 to the surface of the rotating substrate 1a in a small amount while the delivery amount is controlled by a dispenser controller 19, thereby forming the adhesive layer 23.

If the specific gravity of the spacing member falls within a predetermined range with respect to the specific gravity of the adhesive, the spacing members do not float or sink in the syringe 18. Therefore, the delivered adhesive contains a predetermined amount of spacing members, thereby preventing a nonuniform distribution of the spacing members on the substrate. For example, hollow glass beads (diameter: 320 to 400 μm) having various specific gravities were dispersed in an ultraviolet curing type acrylic adhesive having a specific gravity of 1.16, and the resultant adhesives were continuously applied to substrates by using a dispenser. Results are summarized in Table 1. As is apparent from Table 1, if the specific gravity of the spacing member falls within the range of 0.9 to 1.3 times that of the adhesive, stable, uniform coating can be continued in practice. As a result, a recording medium obtained by adhering the substrates has a uniform thickness, i.e., a uniform distance between the substrates.

TABLE 1

| Sample No. | Average Specific Gravity of Hollow Glass Beads | Specific Gravity of Hollow Beads/ Specific Gravity of Adhesive | Conditions after 30-min. Continuous Coating |
| --- | --- | --- | --- |
| 1 | 0.93 | 0.8 | Beads float in syringe and beads are not dispensed. |
| 2 | 1.05 | 0.9 | Uniform coating is possible. |
| 3 | 1.10 | 1.0 | Uniform coating is possible. |
| 4 | 1.34 | 1.15 | Uniform coating is possible. |
| 5 | 1.51 | 1.3 | Uniform coating is possible. |
| 6 | 1.63 | 1.4 | Beads sink in syringe and are concentrated in adhesive. |
| 7 | 2.2 | 1.9 | Beads sink in syringe and are concentrated in adhesive. |

Adhesive: ultraviolet curing type acrylic adhesive OP-6040 available from Denki Kagaku Kogyo K.K.
Viscosity: 4,700 cps (25° C.)
Granules: hollow glass beams having a diameter of 320 to 400 μm
Coating Condition: delivery rate of 8 g/min The adhesive must have a viscosity suitable for coating or printing and proper thixotropic properties (thixotropy).

A material of the spacing member used in the present invention may be any material if it has a specific gravity falling within the range of 0.9 to 1.3 times that of the adhesive. Examples of such a material are a porous or nonporous body or a hollow body of an inorganic compound such as glass, silica, or a metal oxide (e.g., MgO and $Al_2O_3$), or a plastic such as polystyrene, polyethylene, polypropylene, polyester, polyacryl, nylon, and silicone resin. The material of the spacing member should not be dissolved or swelled by an adhesive. Of the granular materials, a polystyrene or acrylic-crosslinked plastic is effective to decrease solubility the adhesive.

The shape of the spacing member is not limited to the spherical shape, but can be replaced with a hexagonal or tetragonal shape. However, the spacing member preferably has a uniform size so as to assure a uniform distance between the substrates.

The size of the spacing member is set to substantially equal the distance between the substrates. Normally, the distance between the substrates falls within the range of 10 μm to 1,000 μm. If a 400-μm diameter spacer member is used, the distance between the substrates is set to substantially 400 μm.

The adhesive used in the present invention may be selected from an ultraviolet curing type adhesive, a thermosetting adhesive, a twin pack adhesive, a solvent volatile type adhesive, a humidity curing adhesive, and a hot melt adhesive. Of these adhesives, the ultraviolet curing type adhesive and the twin pack adhesive are very advantageous in operability and productivity.

Figure 6A:
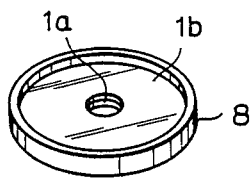
FIGS. 6A to 6C and FIGS. 7A to 7C are schematic perspective views of methods each showing alignment of a pair of substrates constituting the medium of the present invention.

The substrate 1a applied with the adhesive described above is aligned with and adhered to the other substrate 1b (an adhesive may also be applied to this substrate) such that the surface with the adhesive faces inside. In this case, as shown in FIG. 6A, a ring-like jig 8 having an inner diameter substantially equal to the outer diameter of each of the substrates 1a and 1b is placed on a flat plate, and the substrates 1a and 1b are stacked in the jig 8. Then, the substrates 1a and 1b can be adhered to each other without misalignment of their centers.

Figure 6B:
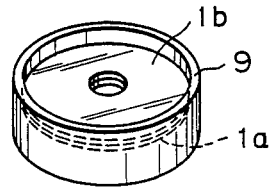
Figure 6C:
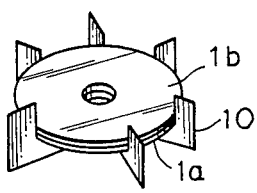

An adhesion jig 9 (FIG. 6B) obtained by fixing the same ring as in FIG. 6A on the flat base, or an adhesion jig 10 (FIG. 6C) as a combination of a plurality of fins but not as a ring-like jig may be used.

Since the standard value of the diameter of the disk is determined to be smaller by 0 to −0.3 mm than the nominal value thereof, the inner diameter of the adhesion jig is smaller than the nominal value by 0 to +0.2 mm and more preferably 0 to +0.1 mm. For example, if a disk has an outer diameter of 130 mm, the inner diameter of the adhesion jig is preferably 130.0 to 130.2 mm.

Figure 7A:
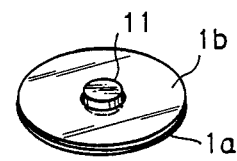
Figure 7B:
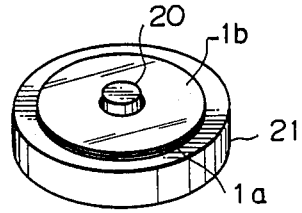
Figure 7C:
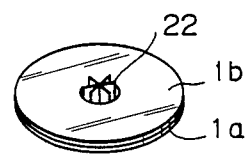

The two substrates may be aligned with and adhered to each other by other methods using an adhesion jig 11 (FIG. 7A) having a columnar member of the same inner diameter of the disk and placed on a flat plate so as to adhere the substrates, an adhesion jig (FIG. 7B) prepared by fixing the same columnar member 20 as in FIG. 7A on a flat plate, or a jig 22 (FIG. 7C) as a combination of a plurality of fins but not as a columnar member. A jig having any shape may be used if it properly fits with the central hole of the disk.

Since the standard value of the disk itself is larger than the nominal value by 0 to 0.1 mm, the diameter of the aligning member is smaller than the nominal value by 0 to 0.1 mm. For example, if a disk has an outer diameter of 130 mm, its inner diameter is 15 mm. In this case, the diameter of the aligning member preferably falls within the range of 15.0 to 14.8 mm.

Figure 8:
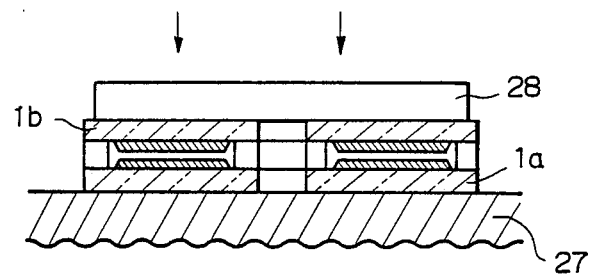
FIG. 8 is a sectional view showing a curing step of an adhesive during the fabrication of the medium of the present invention.

The substrates 1a and 1b stacked as described above are held between press plates 27 and 28, and a uniform load is applied thereto from the above, as shown in FIG. 8. The adhesive is cured, and an optical recording medium is therefore prepared. In this case, if the adhesive is an ultraviolet curing adhesive, the press plate 28 is removed from the resultant structure which is irradiated with ultraviolet rays, thereby curing the adhesive.

The present invention will be described in detail by way of its examples.

(Example 1)

A polymethine dye having a light absorption peak at about a wavelength of 830 nm was spin-coated on a disk-like polycarbonate substrate having an outer diameter of 200 mm, an inner diameter of 35 mm, and a thickness of 1.2 mm to form a 1,000-Å thick recording layer.

Crosslinked PMMA resin beads classified into particle sizes of 420 μm to 490 μm as spacing members were mixed with an ultraviolet curing adhesive OP-6040 (tradename) available from Denki Kagaku Kogyo K.K. at a 10% weight ratio. The specific gravity of the crosslinked PMMA resin was 1.20 while the specifc gravity of the adhesive was 1.16, so that these specific gravities were substantially identical. When the adhesive dispersed with the beads was delivered from the dispenser onto another substrate having the same shape as that described above, thereby forming ring-like adhesive layers near the inner and outer peripheral portions of the substrate.

Each adhesive layer had a width of about 2 mm and a height of about 1 mm. The adhesive layer had a substantially semispherical section.

This substrate was aligned with the substrate with the recording layer such that the surface with the recording layer faced inside and the central holes of the substrates were aligned. A pressure of 5 kg was applied to the entire area of the substrates. The adhered substrates were irradiated with ultraviolet rays (30-sec. radiation at a power of 20 mW), thereby curing the spacer layers constituted by the adhesion layers. The above steps were repeated to 100 two-sided write type optical disks according to the present invention.

The thickness of each optical disk, i.e., the distance between the substrates constituting the optical disk was as uniform as 500 μm.

(Example 2)

Following the same procedures as in Example 1, 100 optical disks using different types of beads were prepared except that various granular beads having a particle size of 420 to 490 μm shown in Table 2 were added to an ultraviolet curing acrylic adhesive OP-6040 available from Denki Kagaku Kogyo K.K. to prepare an adhesive containing spacing members. Results are summarized in Table 2.

TABLE 2

| Spacing Member | Specific Gravity | Specific Gravity of Spacing Member/ Specific Gravity of Adhesive | Thickness Precision of Disk and Productivity |
| --- | --- | --- | --- |
| Hollow Glass Beads | 0.80 | 0.7 | Poor |
| Polypropylene Beads | 0.93 | 0.8 | Poor |
| Polystyrene Beads | 1.05 | 0.9 | Good |
| Nylon Beads | 1.13 | 1.0 | Good |
| Acrylic Beads | 1.18 | 1.0 | Good |
| Porous Glass | 1.25 | 1.1 | Good |
| Silicone Beads | 1.30 | 1.1 | Good |
| Silica Gel | 1.51 | 1.3 | Good |
| Hollow Glass Beads | 1.65 | 1.4 | Poor |

TABLE 2-continued

| Spacing Member | Specific Gravity | Specific Gravity of Spacing Member/ Specific Gravity of Adhesive | Thickness Precision of Disk and Productivity |
|---|---|---|---|
| Glass Beads | 2.20 | 1.9 | Poor |
| Alumina | 3.90 | 3.3 | Poor |

Good: 100 disks can be prepared by continuous coating and adhesion thickness precision of disks is ±30 μm or less.
Poor: Continuous coating of 100 disks cannot be performed and adhesion thickness precision is ±30 μm or more.

(Example 3)

Following the same procedures as in Example 1, 100 optical disks were continuously prepared except that (A) divinylbenzene-crosslinked polystyrene beads were added to a twin pack epoxy resin EPICRON 850 (tradename) available from DAINIPPON INK & CHEMICALS, INC. at a 10% weight ratio, and the resultant adhesive was used as an adhesive containing spacing members, and (B) the adhesive was exposed at room temperature for 20 hours and was cured. The crosslinked polystyrene resin had a specific gravity of 1.05 while the specific gravity of the adhesive was 1.02 (i.e., 1.05/1.02=1.03).

The thickness of each resultant disk, i.e., the distance between the substrates constituting the disk was as uniform as about 500 μm, and all disks had uniform quality.

(Example 4)

Following the same procedures as in Example 3, 100 optical disks were prepared using various beads shown in Table 3. Results are shown in Table 3.

TABLE 3

| Spacing Member | Specific Gravity | Specific Gravity of Spacing Member/ Specific Gravity of Adhesive | Thickness Precision of Disk and Productivity |
|---|---|---|---|
| Hollow Glass Beads | 0.80 | 0.8 | Poor |
| Polypropylene Beads | 0.93 | 0.9 | Good |
| Polystyrene Beads | 1.05 | 1.0 | Good |
| Acrylic Beads | 1.18 | 1.2 | Good |
| Silica Gel | 1.51 | 1.5 | Poor |

Figure 9:
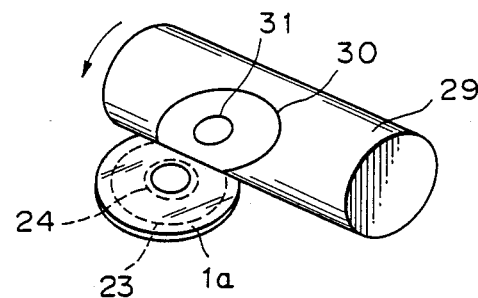
FIG. 9 is a schematic perspective view for explaining a method of applying an adhesive to a substrate by a roll.

When the optical recording media according to the present invention, a method other than the method using a dispenser of FIG. 5 in the step of applying an adhesive to the substrate may be employed. As shown in FIG. 9, an adhesive may be transferred from a plate or blanket cylinder to inner and outer peripheral portions of the substrate, thereby forming ring-like adhesive layers.

Figure 10:
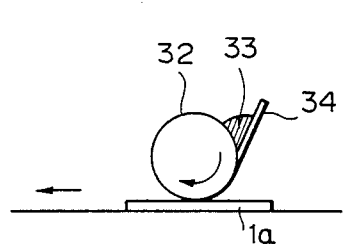
FIG. 10 is a sectional view for explaining the method of applying an adhesive to the substrate by a roll.
Figure 11:
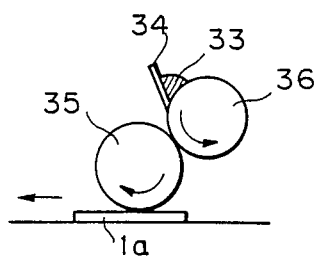
FIG. 11 is a sectional view for explaining a method of applying an adhesive to the substrate by rolls.

Referring to FIG. 9, ring-like adhesive layers 23 and 24 are respectively formed along the inner and outer peripheral portions of a doughnut-like substrate, i.e., a disk substrate 1a having the central hole. A plate or blanket cylinder 29 is used to transfer ring-like adhesive portions 30 and 31 to the substrate 1a. Direct transfer from the plate cylinder to the disk substrate is illustrated in FIG. 10. In this case, a plate cylinder 32 may be a letterpress, intaglio, or litho cylinder. The letterpress and intaglio cylinders are advantageous in transfer efficiency. In order to transfer an adhesive layer from a plate cylinder 36 to a blanket cylinder 35, as shown in FIG. 11, the adhesive is transferred from the plate cylinder 36 to the blanket cylinder 35, and the adhesive is then transferred from the blanket cylinder 35 to the substrate. In this case, the blanket cylinder may be a rubber or metal cylinder. However, since the disk substrate is relatively hard, the rubber blanket cylinder is preferable. Adhesives 33 in which spacing members are dispersed in FIGS. 10 and 11 are transferred by doctor blades 34, respectively. Even in the fabrication of media using above methods, if the specific gravity of the spacing member falls within the predetermined range with respect to the specific gravity of the adhesive, the spacing members and the adhesive can be uniformly mixed by the doctor blade, thereby adhering the substrates while the distance between the substrates is kept uniform.

Figure 12:
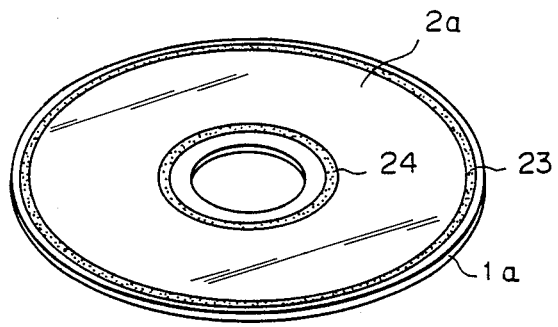
FIG. 12 is a schematic perspective view showing a substrate applied with an adhesive by screen printing.

As shown in the schematic perspective view of . FIG. 12, ring-like patterns as adhesive layers 23 and 24 on a substrate 1a having a recording layer 2a thereon may be formed by screen printing.

Figure 13A:
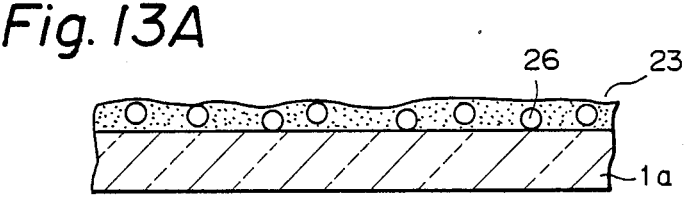
FIGS. 13A and 13B are sectional views showing voids formed when the adhesive is not uniformly applied to the substrate.
Figure 13B:
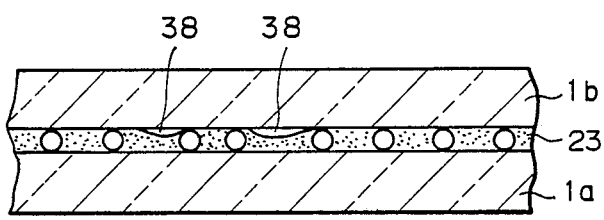
Figure 14:
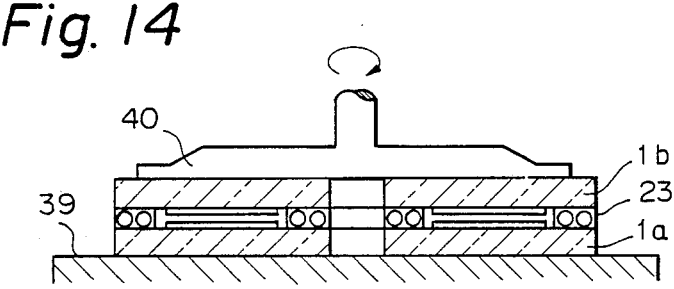
FIG. 14 is a sectional view showing a method of moving the pair of substrates relative to each other after the substrates are aligned during the fabrication of the medium of the present invention.

The adhesive can be applied to the substrate according to various methods. In this case, as shown in FIG. 13A, if the thickness of an adhesive layer 23 containing spacing members 26 and applied to a substrate 1a is not uniform and the substrate 1a is brought into tight contact with the other substrate 1b, voids 38 are formed therebetween upon curing, as shown in FIG. 13B. These voids allow permeation of moisture or dust into the hollow portion and adversely affect stability of the recording layer over time. In order to prevent such a drawback, a technique shown in FIG. 14 may be utilized. As shown in FIG. 14, a load is applied between a base 39 and a press member 40, and the press member 40 is rotated while the load is being applied thereto. Only an upper substrate 1b is rotated about its axis while a lower substrate 1a is kept stationary. The distance between the substrates 1a and 1b is determined by spacing members 26 while a space is assured therebetween. Furthermore, even if an adhesive layer 23 is uniformly applied, voids formed between the substrate 1b and the adhesive layer 23 can be completely eliminated by the above-mentioned rotation. The range of angles subjected to rotation of the substrate is sufficiently 10° to 360°. However, the substrate may be rotated several times if needed.

After the above operations, the adhesive is finally cured to prepare an information recording medium having an air-tight hollow structure and a uniform distance between the substrates.

Only the upper substrate is rotated, as shown in FIG. 14. However, only the lower substrate may be rotated, or both substrates may be rotated in opposite directions. In addition, motion is not limited to rotation if it occurs in a direction parallel to the adhesion surface. The load acting on the substrates need not be applied during rotation, but may be during curing of the adhesive.

The present invention is not limited to the particular embodiment described above. Various changes and modifications may be made within the spirit and scope of the invention. For example, the shape of the substrate is not limited to a disk-like shape, but may be extended to any shape such as a card-like shape. All applications are included in the present invention without departing from the scope of the appended claims.

What is claimed is:

1. A method comprising the steps of:
   forming an optical recording layer on at least one of a pair of substrates;
   applying an adhesive mixture from a storage tank to part of at least one of the pair of substrates, said adhesive mixture being a dispersion of granular or filler-type spacing members in said adhesive, said spacing members having a specific gravity from 0.9 to 1.3 times that of the adhesive in said tank, the spacing members and the adhesive being mixed to prepare a mixture, said mixture being supplied in a small amount from said tank in each applic cycle;
   adhering the pair of substrates while an optical recording layer faces inside; and
   curing the adhesive.

2. A method according to claim 1, wherein each of said substrates comprises a disk having a central hole, and the adhesive mixture is applied such that the adhesive mixture is dispensed from a dispenser to the inner and outer peripheral portions of each said substrate while the substrate is rotated.

3. A method according to claim 1, wherein the adhesive mixture is applied to each said substrate by transferring the adhesive mixture from a roll-like plate or blanket cylinder to each said substrate.

4. A method according to claim 1, wherein the adhesive mixture is applied to each said substrate by screen printing.

5. A method according to claim 1, wherein each said substrate comprises a disk having a central hole, and the step of adhering the substrates comprises the step of using a jig for aligning the central holes of the substrates.

6. A method according to claim 5, wherein the jig comprises a ring-like member having an inner diameter substantially equal to an outer diameter of each said substrate.

7. A method according to claim 5, wherein the jig comprises a columnar member having an outer diameter substantially equal to an inner diameter of the central hole of each said substrate.

8. A method according to claim 1, wherein the adhesive comprises an ultraviolet curing type adhesive, and the step of curing the adhesive comprises the step of emitting ultraviolet rays onto the adhesive.

9. A method according to claim 1, further including the step of relatively moving the substrates in a direction parallel to adhesion surfaces thereof after the substrates are adhered and the adhesive is thereafter cured.

* * * * *

UNITED STATES PATENT AND TRADEMARK OFFICE
CERTIFICATE OF CORRECTION

PATENT NO. : 4,892,606
DATED : January 9, 1990
INVENTOR(S) : TAKESHI MIYAZAKI ET AL.   Page 1 of 2

It is certified that error appears in the above-identified patent and that said Letters Patent is hereby corrected as shown below:

COLUMN 1

Line 20, "1b central" should read --1b have central--.
    Line 44, "uniform," should read --uniformly,--.
    Line 51, "that;" should read --that--.

COLUMN 3

Line 32, "(e.g., Te an Bi)" should read
         --(e.g., Te and Bi)--.

COLUMN 5

Line 2, "solubility" should read --solubility of--.

COLUMN 6

Line 21, "thereby forming" should be deleted.
    Line 23, "substrate." should read
         --substrate were formed.--.

COLUMN 7

Line 52, "When" should read --When making--.

UNITED STATES PATENT AND TRADEMARK OFFICE
CERTIFICATE OF CORRECTION

PATENT NO. : 4,892,606
DATED : January 9, 1990
INVENTOR(S) : TAKESHI MIYAZAKI ET AL.   Page 2 of 2

It is certified that error appears in the above-identified patent and that said Letters Patent is hereby corrected as shown below:

COLUMN 9

Line 14, "applic cycle;" should read --application cycle;--.
Line 23, "each" should be deleted.

Signed and Sealed this

Twenty-fifth Day of February, 1992

Attest:

HARRY F. MANBECK, JR.

Attesting Officer    Commissioner of Patents and Trademarks